United States Patent [19]
Derr

[11] 3,749,089
[45] July 31, 1973

[54] OVULATION MONITOR

[76] Inventor: Lloyd J. Derr, 4624 Willa Lee, La Crescenta, Calif. 91214

[22] Filed: Oct. 26, 1971

[21] Appl. No.: 192,415

[52] U.S. Cl. .............................. 128/2.1 E, 128/407
[51] Int. Cl. ........................ A61b 5/00, A61b 10/00
[58] Field of Search ...................... 128/2.1 R, 2.1 E, 128/2.1 Z, 2 R; 324/71

[56] References Cited
UNITED STATES PATENTS

| 3,313,293 | 4/1967  | Chesebrough et al. | 128/2.1 E |
| 3,480,003 | 11/1969 | Crites              | 128/2.1 E |
| 902,753   | 11/1908 | Marshall            | 128/2.1 R |
| 3,403,684 | 10/1968 | Stiebel et al.      | 128/407   |
| 1,910,021 | 5/1933  | Legg                | 128/2.1 R |
| 3,680,544 | 8/1972  | Shinnick            | 128/2 R   |
| 2,661,734 | 12/1953 | Holzer et al.       | 128/2.1 Z |
| 2,799,269 | 7/1957  | Mathison            | 128/2.1 Z |

OTHER PUBLICATIONS

Medical & Biological Engineering, Vol. 9, No. 6 Nov. 1971, pages 657–664, V. Pollak, Potential Distribution in the Tissue.

Primary Examiner—Aldrich F. Medbery
Attorney—Samuel Lindenberg, Marvin E. Jacobs et al.

[57] ABSTRACT

An instrument for monitoring ovulation including a dual electrode vaginal probe and monitoring device for indicating the magnitude and polarity of the electrochemical response of vaginal fluids with the electrodes. The instrument detects the biochemical change of vaginal fluids from an acidic oxidative response to the temporary reductive response occurring coincident with ovulation. This response can be utilized for an aid to contraception, as an aid to conception or to aid in determining the sex of offspring.

18 Claims, 6 Drawing Figures

OVULATION MONITOR

BACKGROUND OF THE INVENTION

1. Field of the Invention

The present invention relates to a method and apparatus for monitoring the onset and duration of ovulation in humans and, more particularly, to an instrument for detecting the biochemical change in vaginal fluids during ovulation.

2. Description of the Prior Art

It is well documented that the monthly fertile period of the human female is substantially coincident with ovulation. However, the onset of ovulation varies with body conditions, length of menstrual cycle, progressive cycles, age of subject, emotional stress and general health. Thus, the onset of ovulation could not be estimated by day counting from the previous menstrual cycle. It has been shown by many clinical tests that ovulation can occur on any menstrual day from less than 10 to more than 17, using an average cycle length of 28 days.

Referring now to FIG. 1, the Farris method for control of conception was based on 761 observations on 232 subject women and was intended to be an improvement on the "rhythm method" which had not proved to be very successful. This plan was quite complex to use. It required that the preceding three consecutive menstrual cycles be averaged to the nearest whole day and this average be divided by two to give the mid-day cycle from which two days were subtracted to provide the most likely day for ovulation and conception from which two further days were subtracted to determine the earliest day of the fertile period. Though the fertile period was estimated as only occurring over a 2 day period, 5 further days were suggested to be added to the determined latest possible day of fertility, thus requiring an abstinence period 12 of 7 to 8 days. If this method is to be used for contraception, an even more complicated calculation is required if the cycle length varies by 5 days or more which is a condition common to about 80 percent of all women.

Another method prominently used for at home detection of ovulation is the measurement of rectal temperature variations, as illustrated in FIG. 2. Determination in this case must be made by resolving small parts of 1° change. A record of body temperature is taken daily under standard conditions to develop a typical curve 14 during the menstrual cycle. The temperature is relatively low during the first part of the month, drops to a minimum throughout the time that ovulation supposedly occurs and rises definitely thereafter to relatively high level which is maintained until the next menses when the temperature drops abruptly. However, as shown in FIG. 2, the temperature only rises 2 to 3/5 of a degree which must correspond with a similar rise in the previous cycle and it must not be due to illness. Thus, it has been assumed that ovulation is occurring somewhere near in time to the low point 16 of the thermal chart. However, there is no agreement on the exact association of ovulation with this low temperature. Some observers indicate that ovulation usually occurs after the temperature is past its low point and has begun its rise and others have reported that over three-fourths of the time the results are atypical and no real correlation exists between time of ovulation and any definite point on the temperature curve.

Various other methods now in use for determining the time of ovulation have certain obvious disadvantages. Some of these, such as laparotomy, have only academic interest. Measurement of activity and subjective feelings such as localized abdominal pain lack value due to the fact that too much is left to the patient and is not experienced by a majority of the women. Endometrial biopsies and hormonal assays measure ovulation after the event has occurred. The rat hyperemia test measures ovulation by the reaction of the ovary of the immature white Wister rat to the urine of the patient. This is an involved, sophisticated test requiring the services of a clinical laboratory.

More recently, it has been established that the composition of the fluids present in the vaginal tract change during the cycle as ovulation occurs from a general acid-progesterone composition to an alkaline-reductive-estrogenic composition and reverts to the first composition after ovulation which continues until menstruation. This biochemical change associated with ovulation is accessible through the vaginal fluids of the human female. Although accurate as an indication of ovulation, it is a bothersome and complicated clinical method of determining onset of ovulation.

A major component of the reductive fluids present during ovulation is glucose which is abundant in the cervical mucous at the time of ovulation. The glucose test tapes used by diabetic subjects can be utilized to indicate the excretion of glucose. This requires insertion of the tape by the subject into contact with the cervix for 10 to 15 seconds and a comparison of the developed color with the standard color charts supplied with the tape dispenser. The procedure is uncomfortable and unacceptable to many women and relies on the subjective evaluation of relative gradations of color to indicate an absolute phenomena, i.e., the onset of ovulation.

OBJECTS AND SUMMARY OF THE INVENTION

Therefore an object of this invention is to provide an improved technique for detecting biochemical changes in vaginal fluids which are associated with the ovulation process of the human female.

A further object of the invention is the provision of a simplified, accurate, reliable instrument and technique for use by the subject at home to determine the ovulation and fertility period.

Yet another object of the invention is to provide a simple and efficient electrochemical instrument for detecting the reductive changes in the composition of vaginal fluids which are correlatable to the ovulation processes of the human female.

These and other objects and many attendant advantages of the invention will become apparent as the description proceeds.

The ovulation monitor in accordance with the invention comprises an electrode probe portion for insertion into the vagina capable of generating voltage-current parameters which are characteristic of the oxidative or reductive nature of the vaginal fluids and a monitoring device for measuring and indicating magnitude and polarity of the electrical parameters generated by the probe. An indication of polarity reversal may be given in lights, numbers, sounds or any other indicia indicative of the reversal change. On insertion of the probe into the vaginal tract, the indicator instantaneously responds to provide an instantaneous analysis of the characteristic composition of the vaginal fluids so as to indicate onset of ovulation. The instrument is safe and easy to utilize and the clinically sanitary condition of the probe is readily maintained by the use of standard antiseptics such as alcohol.

The probe preferably consists of two similar dual-metal electrodes physically supported on an elongated electrical insulating body with one of the electrodes disposed adjacent one end of the body and the other electrode disposed a further portion down the length of the support body. Each electrode assembly is separately connected by a suitable connector to each side of the measuring device.

The measuring device is capable of measuring small voltages in the range of ± >0.1 volt d.c. and currents in the range of + or − 25 micro amp ($\mu A$), and is capable of indicating the polarity of the current. Suitably the indicator is a high impedance FET balanced differential amplifier utilized to drive a zero center + or − 25 microammeter.

With the probe connected to the indicator device, it is inserted into the vagina of the subject, until the last most electrode make contact with the vaginal opening. Since the fluids generated in the subject's reproductive system are more strongly concentrated in the upper tract of the vagina in the vicinity of the cervix rather than in the vaginal opening which is often washed by urine, the upper most electrode will experience greater chemical reaction with the vaginal fluids than the lower most electrode. Being substantially identical electrode assemblies, the electrochemical potential generated between the electrodes is proportional to concentration. This difference in electrochemical potential is measured by the indicating device. The polarity of that indication is an identification as to the type of reaction being experienced, i.e., oxidation or reduction. The probe is generally connected so that oxidizing action produces a negative reading on the meter while reducing action produces a positive indication.

Since reducing chemicals do not predominate in the female reproductive system for generally more than 1 or 2 days of the menstrual cycle, the meter is seen to swing from negative to positive on these days, and then swing back to negative again as the days of ovulation pass. Thus, only the peak of the reductive chemical concentration is indicated by the system of the invention.

The invention will become better understood by reference to the following detailed description when considered in conjunction with the accompanying drawings.

DESCRIPTION OF THE PREFERRED EMBODIMENTS

Figure 4:
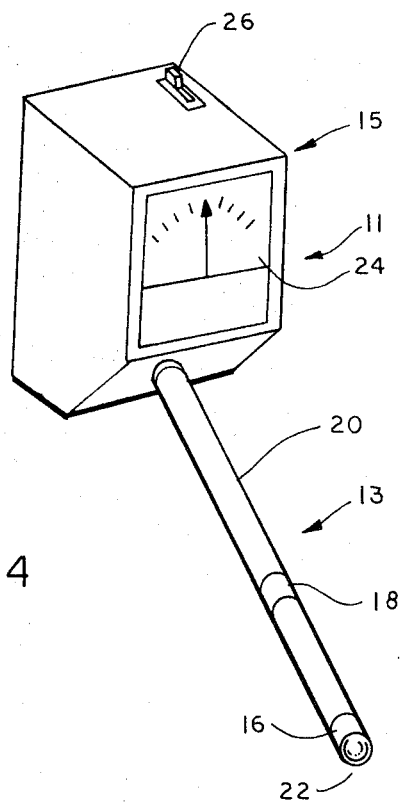
FIG. 4 is a perspective view of the device in accordance with the invention.

Referring now to FIG. 4, the ovulation monitor 11 in accordance with the invention generally includes a probe assembly 13 and an indicating unit 15 which may be separate or pYysically attached to the probe as shown. The probe 13 is a generally cylindrical insulator body 20 supporting the electrodes 16 and 18 in spaced relation. The outermost electrode 16 is preferably disposed adjacent the tip 22 of the probe so as to be insertable, as close as possible, to the highest concentration of biologically active fluids present near the opening of the cervix. The rear most electrode 18 is spaced a distance apart sufficient to develop a chemical and therefore electrochemical gradient. Suitably, the electrodes are spaced about 2 ½ inches apart, but are not restricted to any critical separation which is possible within the length of the insulating probe body.

The indicating unit 15 contains suitable meters for measuring the galvanic current developed by the probe, suitably displayed by a meter 24 and activated by an on-off switch 26. Many different types of measuring instruments may be utilized to monitor the galvanic current. The probe's electrodes when inserted are in contact with a voltage-producing electrochemical fluid gradient along the vaginal wall in a longitudinal direction. The wall area wetted by the vaginal fluids between the electrodes is a resistance ($R_f$) between the observation points, i.e. the electrodes. The electromotive force ($E_f$) between these points due to electrochemical reaction of the electrodes causes a current ($I_f$) to flow in proportion to that electromotive force and the wetted wall resistance according to the relationship: $I_f = E_f/R_f$.

The monitoring device is placed in parallel with $R_f$ with a meter having a high impedance such that a current of about + or − 25 microamperes flows in an ammeter. The high impedance prevents excessive currents being drawn from the electrode to prevent excessive polarization of the electrodes.

In order to function effectively for the intended purpose, the spaced electrodes must develop a clearly measurable potential in both oxidizing and reducing media. Thus, each electrode must be capable of acting as either a cathode or an anode in repetitive succession.

In earlier tests with single metal electrodes of the same type of metal or of alloy metal types, reversible currents were observed but the signal sometimes faded, the data was inconsistent and the electrodes were easily polarized. The desired cathodic-anodic reversibility was obtained by using dual metal electrodes. Signals of the highest magnitude and of greatest consistency were obtained when the dual metals of each electrode had opposite polarities in a reducing medium and the polarity reversed in an oxidizing medium. It was further determined that the electrodes be formed of the same alloy or the same combinations of metals or they will form a galvanic battery of one polarity only.

When a single metal element is subjected to an acid, it oxidizes according to the two following characteristics:

1. The metal develops an electrochemical potential with the acid which can be positive or negative depending upon the type of metal. This potential resists oxidation if it is positive in relation to $H^+$ acid ion. The potential aids oxidation if the potential is negative. Oxidation is the phenomena of the metal giving up an electron.

2. Certain metals are anodic by nature and do not oxidize easily. Cathodic metals have more tendency to oxidize.

In a dual metal electrode, the final electrical potential developed by the electrically connected disimilar metals when subjected to an acid environment is the sum of the two individual electrochemical potentials of the different metals. For example, with the metals, gold and chromium, as components of the dual electrode, in an oxidizing environment we see that:

$Cr \rightarrow Cr^{++} + 2e$ providing a potential of +0.557 volts, while $Au \rightarrow Au^{+} + e$ providing a potential of −1.5 volts.

By electrically connecting them together we get the sum of the voltages or; $-1.5 + 0.557 = -0.943$ volts.

Thus, chromium loses its protective positive potential and is caused to oxidize much more than it would by itself. The gold negative potential is reduced which gives it slightly more protection from the oxidizing medium. Thus, for weak solutions of acid, greater oxidation reaction is realized by the combination dual-metal electrode (Au/Cr).

Prior to the ovulation, the numerous days of acid condition in the vaginal tract will condition the dual electrode with an oxidized molecular film. This film tends to polarize the electrodes and aids in the detection of polarity reducing fluid which will prevail during the ovulation period.

In a reducing fluid, the electrochemical reactions of the metals reverse. The metal tends to take on electrons from the fluid and develops an opposite electrochemical potential. The reduction action is not as strong. For the reaction:

$Cr^{+++} + e \rightarrow Cr^{++}$ develops a potential of −0.41 volts while $Cr^{++} + 2e \rightarrow Cr$ (total reduction) producing a potential of −0.557 volts.

But the total reduction of gold provides according to the following:

$Au^{+} + e \rightarrow Au$ (total reduction) giving it a potential of 1.42 volts. Gold is anodic by nature and easily reduces.

When the two metals are electrically connected, the sum of the potentials is either:

$+1.42 - 0.41 = 1.02$ volts or $+1.42 - 0.557 = +0.863$ volts

Thus, the reluctant chromium with a positive potential is forced to reduce to a much greater extent than it would by itself. The dual electrodes become a sensitive indicator of reducing agents after they have been conditioned by oxidation in an acid solution.

Figure 5:
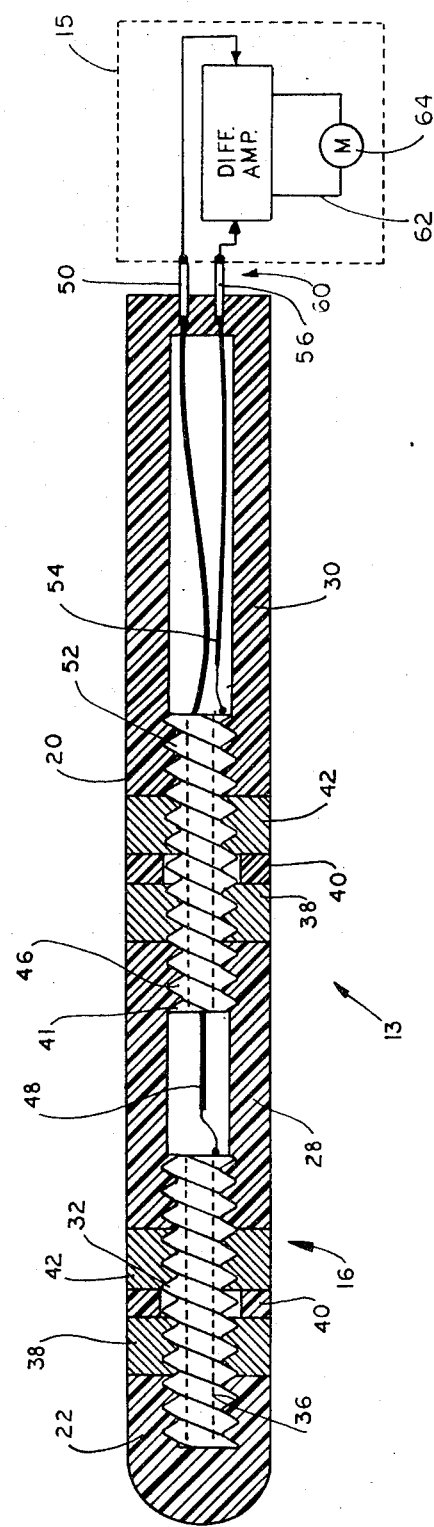
FIG. 5 is a cross-sectional view of the probe assembly of the device of the invention.

Referring now to FIG. 5, the probe 13 is in the form of an elongated cylindrical, insulating body 20 formed of a rounded tip section 22, spacer section 28 and end section 30. The sections are formed from fairly rigid, smooth, non-irritating and nontoxic materials such as synthetic resins such as Nylon (polyamide), Teflon (polytetrafluoroethylene), polyethylene or silicone such as polysiloxane. A machinable plastic such as Nylon is preferred.

The sections are joined to the electrodes into an integral waterproof unit. Preferably, the sections are threaded onto first and second threaded support conductor pipes 32, 34, suitably formed of brass. The tip 22 has internal threads 36 received over the forward end of pipe 32.

The forward electrode 16 comprises a threaded gold plated disc 38, an insulating spacer 40 and a threaded chrome plated brass disc 42 which are screwed onto the middle portion of the pipe 32. The forward, threaded end 41 of the spacer section 28 is received on the rear portion of the pipe 32. The rearward threaded end 46 of the spacer section 28 is received on the front end of the pipe 34. An insulated electrode lead 48 is connected to the pipe 32 extends through the spacer section 28 and pipe 34 and is connected to one prong 50 mounted in the end wall of the end section 30.

The rear electrode 16 also comprises a gold plated disc 38, spacer 40 and chrome plated disc 42 which are mounted on pipe 34. The forward threaded end 52 of the end section 30 is joined to the rear end of the pipe 34. An insulated lead 54 is connected to the pipe 34 and to the second prong 56 of the connector 60.

The connector 60 is adapted to be inserted into a mating socket on the indicator unit 15. Suitably, as shown, the output from each electrode is applied to each side of a high impedance FET balanced differential amplifier 62. The micrometer 64 measures the differential output of the amplifier 62.

A device was constructed from 200 mil thick, 500 mil diameter gold plated and chromium plated brass disc electrodes. The probe was tested in vitro in various solutions to determine the ease of polarization and depolarization and therefore, its operability in the intended environment. The tests were conducted by inserting the outermost electrode into various fluids while the rearmost electrode was referenced to water in order that the device will experience a gradient and develop an electrochemical potential similar to the conditions, the probe would consider with the forward electrode adjacent the cervix and the outer electrode nearer to the opening to the vaginal canal. The two electrodes were electrically connected on their outer surfaces by means of a towel wetted half the distance to the next electrode with water and half the distance with the fluid being tested. The wetted probe was then connected to the indicator unit and polarity and amplitude readings were obtained. The following fluids were tested and compared to water.

TABLE 1

| FLUIDS | READING | POLARITY |
|---|---|---|
| Progesterone | 25 | Negative |
| Estrogen | 25 | Negative |
| Glucose | 25 | Positive |

These experiments indicate that glucose is the fluid capable of giving the positive readings. Further experiments were conducted by saturating the probe with estrogen and then diluting it with glucose. The negative estrogen reading was converted to a +15 microamp reading. When a progesterone soaked probe was diluted with glucose, the −25 reading was reduced to zero.

Returning again to the hormonal fertility cycle, the anterior pituitary glands secrete the gonadotropic hormones which stimulate the ovary. This in turn produces in the first half of the menstrual cycle, the follicle-stimulating hormone, estrogen, and in the mid cycle, the luteinizing hormone, progesterone. During the first half of the cycle, the follicle-stimulating hormone stimulates an ovarian follicle to grow. The ovum, which is contained in the growing follicle, matures and the estrogenic hormone, estrogen, is secreted by the follicle. In the middle of the menstrual cycle, the follicle expels the ovum and then changes into the corpus luteum. This corpus luteum is now stimulated by the luteinizing factor to excrete the other female hormone, progesterone. Thus progesterone prevails in the vaginal tract, in the middle of the female cycle while estrogen prevails during the early and latter part of the cycle.

In terms of response to the ovulation monitor of the invention, when progesterone and estrogen are present the instrument will always respond with a signal of negative polarity if connected as described herein. When glucose is present in the presence of progesterone, the signal is negative or zero but when glucose is present in the presence of estrogen, the monitor provides a positive reading characteristic of ovulation.

Thus, the instrument of the invention provides a negative reading over almost the whole cycle and only a 2 or 1 day positive reading which is coincident with ovulation. Furthermore, the ovulation monitor is not a Ph probe system where an unlike reference electrode is used to determine the degree of acidity. A Ph electrode is not capable of sensing the reductive fluids and the dual metal system electrode of the invention when tested in vitro was found to be insensitive to Ph variations.

The dual metal electrode may be formulated by diverse metal pairs that will provide the desired oxidation-reduction, anode-cathodic reversibility for depolarization of the electrode surfaces. The probe can be manufactured from aluminum-silver, or brass elements for example. However, the gold chromium combination has been found to provide long term, non-toxic use in human subjects and also provides the largest signals in both polarity directions. Metals of the pair should be selected such that one has a naturally anodic potential and one has a naturally cathodic potential so that in combination they function effectively in either polarity.

It is best to take readings immediately upon arising before urination. If not possible, a regular time of day should be selected for the readings, but generally not within 1 hour after urination or douche. The probe connection is inserted into the monitoring unit and the probe is inserted into the vaginal tract only until the last electrode has entered the opening of the vagina. The switch is actuated and the meter read, the probe is then removed and may be washed and sterilized with alcohol, if desired.

Figure 6:
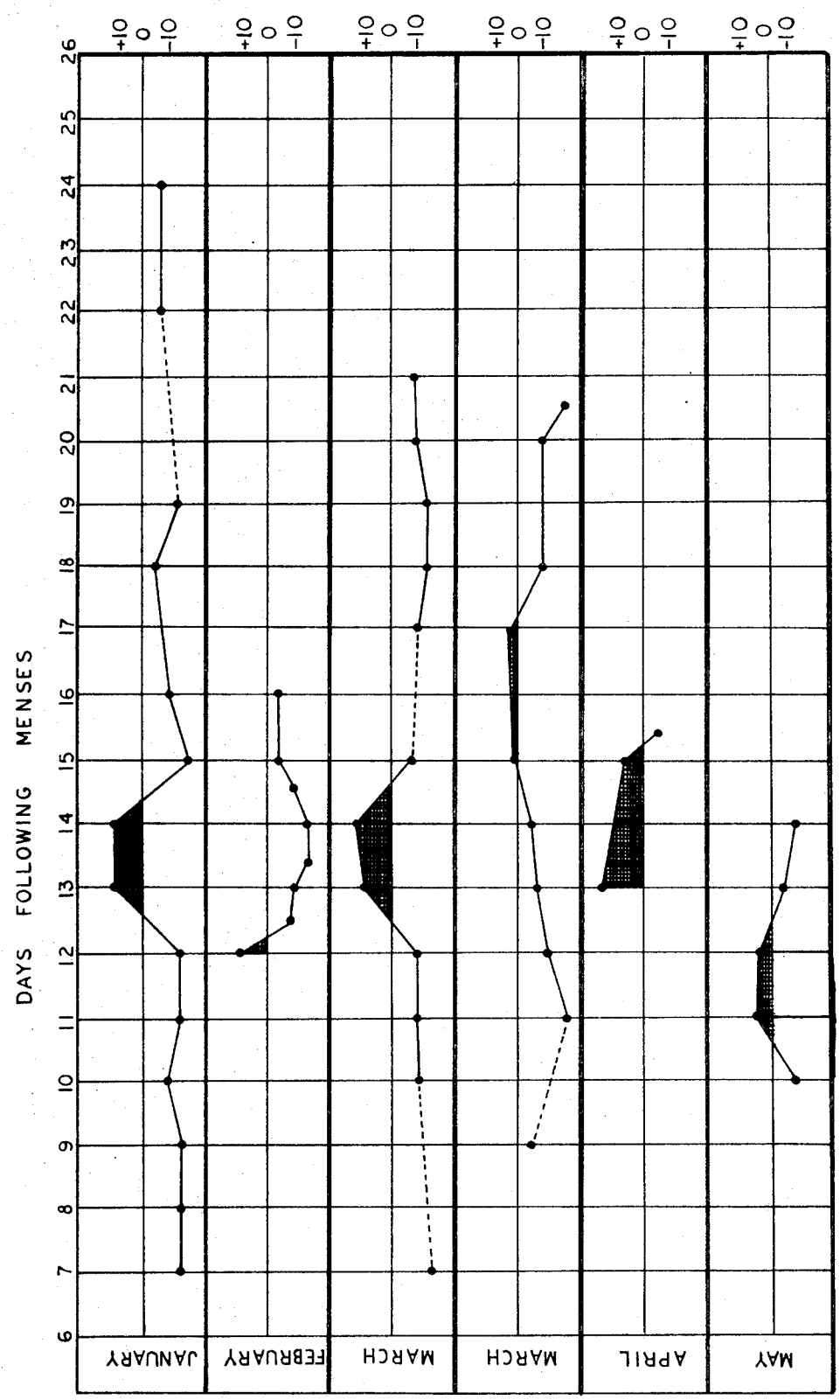
FIG. 6 is a series of charts illustrating the response over a 6 month test with a female subject.

The ovulation monitor has been utilized by several subjects over several consecutive monthly periods. A typical 6 month cycle in terms of meter responses is shown in FIG. 6. These readings were obtained with a brass electrode, which should not be utilized for long periods without clinical control due to the possibility of irritation by zinc ions. Tests on several other subjects confirm the cyclic pattern. A further indication of the correlation of the electrochemical response of the monitor to ovulation was the absence of a cyclic response on a subject who had a hysterectomy performed before the test.

Figure 1:
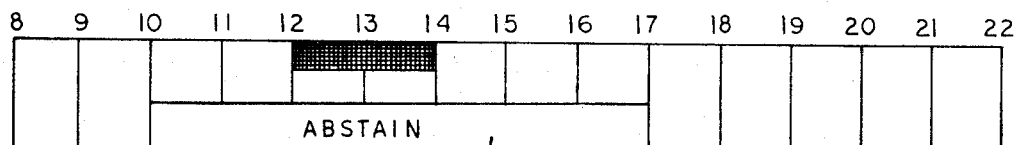
FIG. 1 is a graph of a typical method of calculating the fertility cycle according to the Farris plan.
Figure 2:
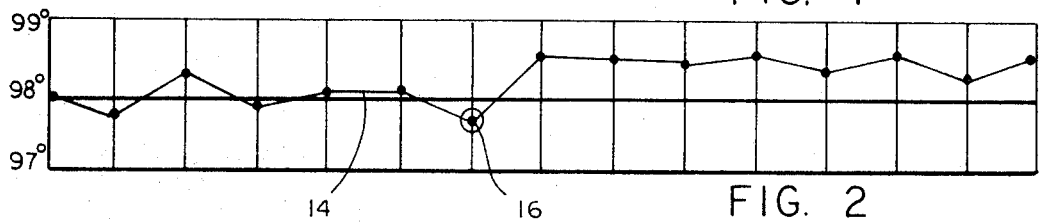
FIG. 2 is a graph illustrating the typical human female response to the thermal chart method of determining fertility.
Figure 3:
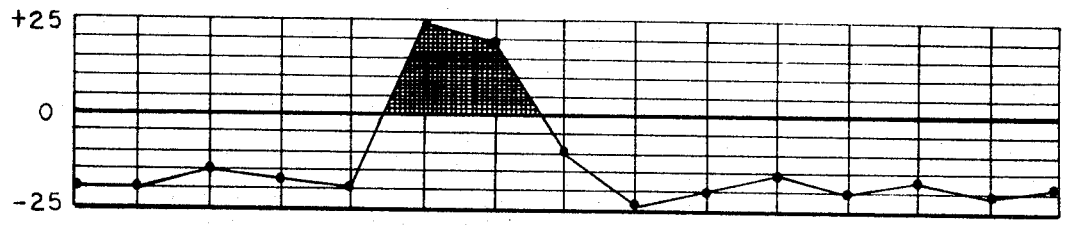
FIG. 3 is a graph showing the response of the indicating device in accordance with the invention over a typical 1 month cycle.

A graph showing the range of typical response with the gold chromium electrodes is illustrated in FIG. 3. As can be seen from FIG. 3, the magnitude of response is from +25 to −25 microamps which is a much stronger signal then experienced with the brass electrodes.

Furthermore, the gold chromium instrument is easier to depolarize, and maintain in highly sensitive and responsive conditions. The in vitro data demonstrates and confirms the known biochemistry of the reproductive cycle and in the vitro test conducted with the monitor of the invention. The reducing chemicals do not predominate in the female reproductive system for generally more than one or two days of the cycle. Thus, the meter is seen to swing from negative signals indicative of oxidizing condition to a positive signal indicative of reduction condition during the days of ovulation. The meter then swings back to negative again as the ovulation period is terminated. Thus, only the peak of the reductive chemical concentration is indicated by the ovulation monitoring system of the invention.

The ovulation monitor of the invention has other uses in addition to monitoring fertility. It can be used as an aid in optimizing the timing of conception, or as a contraception aiding technique. It has been shown that approximately 15 days after conception, there is a hormonal condition created within the vaginal tract causing a reductive response for approximately 4 to 5 days. Since such a response is completely anomalous to that expected for ovulation, it can be utilized as a positive indication of conception. This can be extremely important for females who must not allow pregnancy to proceed for critical health reasons and can obtain an early indication of pregnancy for reasons of therapeutic abortion.

Furthermore, recent studies tend to confirm theories that carefully selected timing of intercourse with ovulation can tend to increase the probabilities of conception of female or male offspring. It has been shown that the female sperm is larger and more capable of withstanding an acid medium, the condition which prevails during the early part of ovulation. However, the male sperm which are smaller, more vigorous, more mobile and more numerous, are capable of withstanding the more neutral medium prevailing later on in the ovulation cycle and therefore have more chance of fertilizing the egg. Therefore, the more sensitive and accurate ovulation monitor of the invention can be utilized in combination with the known data to aid in determining selection of the sex of the offspring It is to be realized that only preferred embodiments of the invention have been described and that numerous substitutions, alterations and modifications are all permissible without departing from the spirit and scope of the invention as defined in the following claims.

What is claimed is:

1. An instrument for monitoring ovulation comprising:
   a vaginal probe assembly including first and second electrode means for sensing the composition of vaginal fluids and developing a first electrochemical signal having a first polarity when said vaginal fluid has one composition and a second signal having an opposite polarity when said vaginal fluid has another composition; and
   monitoring means connected to said electrode means for indicating the polarity and magnitude of said signals.

2. An instrument according to claim 1 in which said probe assembly includes an elongated cylindrical fluid impervious, electrically insulating body supporting said electrodes in spaced relationship with the surface of the electrodes exposed to contact said fluid.

3. An instrument according to claim 2 in which the forward end of said probe terminates in a rounded tip and the rear wall of said body includes a dual terminal electrical connector for connection to said monitoring means.

4. An instrument according to claim 3 in which the body of said probe is hollow and a single conductor extends from each of said electrodes to each terminal of the connector.

5. An instrument according to claim 2 in which said first electrode means is disposed adjacent the tip of the probe body and said second electrode means is disposed from 1 to 5 inches from the first electrode.

6. An instrument according to claim 1 in which at least one of said electrode means is formed of two electrically connected metals which develop opposite polarity signals in reducing and oxidizing mediums.

7. An instrument according to claim 1 in which said first and second electrode means are each formed of the same two electrically connected metals which develop opposite polarity signals in reducing and oxidizing mediums.

8. An instrument according to claim 7 in which said first and second electrode means are each formed of two separate metal discs; and
there is a conductor support means for electrically connecting the discs of each electrode means into a dual metal electrode.

9. An instrument according to claim 8 in which said conductor support meAns comprises a first hollow metal pipe supporting and connecting the two metal discs of said first electrode and a second hollow metal pipe supporting and electrically connecting the two metal discs of said second electrode.

10. An instrument according to claim 7 in which the first metal of an electrode is chromium and the second metal of an electrode is gold.

11. An instrument according to claim 1 in which the monitoring means includes a high impedance field effect transistor balanced differential amplifier and a zero center microammeter for measuring the output of the amplifier.

12. A method of detecting biochemical changes in the vaginal fluid of the human female comprising the steps of:
contacting the vaginal fluid of the subject with an electrode probe supporting a first electrode adjacent the cervix of the subject and a second electrode disposed adjacent the vaginal opening;
measuring the polarity and magnitude of the electromotive force developed between the electrodes; and
displaying the moment of polarity reversal of said electromotive force as an indication of biochemical change in the composition of the fluid.

13. A method according to claim 12 including the step of observing the polarity reversal as indicative of the presence of reductive fluids and the onset of ovulation.

14. A method according to claim 12 which includes the step of making each of the electrodes from a pair of dissimilar metals which when electrically connected are capable of functioning as an anode and cathode in oxidizing and reducing media.

15. A method according to claim 14 further including the step of conditioning said electrodes by exposing them to an oxidizing media before exposing them to the reducing media present during ovulation.

16. An instrument for monitoring ovulation comprising a vaginal probe assembly including:
a first electrode assembly and a second electrode assembly;
both said electrode assemblies being supported spaced from each other on the surface of said probe for exposure to a vaginal fluid at two different locations;
each said electrode assembly comprising two spaced electrically connected metals providing means for producing a voltage having one polarity in the presence of a vaginal fluid in an oxidizing state and an opposite polarity in the presence of a vaginal fluid in a reducing state; and
indicating means connected to said electrode assemblies for indicating the polarity and magnitude of the resulting voltage developed.

17. An instrument for monitoring as recited in claim 16 wherein one of the metals of each said electrode assembly has the property of functioning as an anode in an oxidizing media and as a cathode and a reducing media; and
the other of the metals of each said electrode assembly has the property of functioning as a cathode in an oxidizing media and as an anode in a reducing media.

18. An instrument for monitoring as recited in claim 17 wherein one of said metals in said electrode assembly is gold and the other of said metals is chromium.

* * * * *